(12) United States Patent
Clemons

(10) Patent No.: US 7,297,369 B2
(45) Date of Patent: Nov. 20, 2007

(54) PROCESS FOR MICRO-GROOVING A POLYMER ALIGNMENT LAYER FOR A LIQUID CRYSTAL DISPLAY

(75) Inventor: Gregory S. Clemons, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 10/814,571

(22) Filed: Mar. 31, 2004

(65) Prior Publication Data

US 2005/0221009 A1 Oct. 6, 2005

(51) Int. Cl.
*B05D 3/12* (2006.01)
*B05D 5/00* (2006.01)

(52) U.S. Cl. .................... 427/358; 427/356; 427/164

(58) Field of Classification Search ........... 427/358, 427/356, 164
See application file for complete search history.

(56) References Cited

U.S. PATENT DOCUMENTS

| | | | | |
|---|---|---|---|---|
| 3,919,377 | A | * 11/1975 | Dow et al. | ................ 264/147 |
| 5,705,096 | A | * 1/1998 | Kano et al. | ............. 252/299.4 |
| 2003/0035231 | A1* | 2/2003 | Epstein et al. | ............. 359/834 |
| 2004/0150141 | A1 | 8/2004 | Chao et al. | |
| 2006/0050187 | A1* | 3/2006 | Hirai et al. | .................... 349/5 |

FOREIGN PATENT DOCUMENTS

| | | |
|---|---|---|
| JP | 57192926 | 11/1982 |
| JP | 58-100121 | * 6/1983 |
| JP | 58100121 | 6/1983 |
| JP | 04372931 | 12/1992 |
| JP | 6034975 | 2/1994 |
| WO | PCT/US2005/010774 | 7/2005 |

OTHER PUBLICATIONS

Lee, E. S. et al., "Control of the LC Alignment Using a Stamped Morphology Method and Its Application to LCD's", May 16, 1993, SID International Symposium—Digest of Technical Papers, pp. 957-960.

* cited by examiner

*Primary Examiner*—Fred J. Parker
(74) *Attorney, Agent, or Firm*—Blakely, Sokoloff, Taylor & Zafman LLP

(57) ABSTRACT

A process is disclosed for imprinting microgrooves in a polymer layer to create an alignment layer for a liquid crystal display. In one embodiment, the process comprises providing a transparent substrate having a polymer film applied on one side thereof, providing a tool having a contact surface, the contact surface having a plurality of microgrooves formed thereon, and pressing the contact surface against the polymer film. Additional embodiments are also disclosed and claimed.

17 Claims, 8 Drawing Sheets

US 7,297,369 B2

PROCESS FOR MICRO-GROOVING A POLYMER ALIGNMENT LAYER FOR A LIQUID CRYSTAL DISPLAY

TECHNICAL FIELD

The present invention relates generally to liquid crystal displays and in particular, but not exclusively, to the formation of microgrooves in an alignment layer of a liquid crystal display.

BACKGROUND

Liquid crystal cells are commonly used as part of liquid crystal displays associated with electronic devices such as televisions, watches, calculators, computer displays, and mobile telephones. FIGS. 1A and 1B illustrate, respectively, a side elevation and a plan view of an embodiment of a liquid crystal (LC) display cell 100. The LC display cell 100 comprises a die 102 having a dam 106 formed on a surface 104 thereof. The dam 106 forms a sealed perimeter around a portion of the surface 104. A transparent cover 108 having surfaces 112 and 113 is attached and sealed around its perimeter to the dam 106 such that a small portion of the cover 108 overhangs the dam. The surface 104 of the die 102, the dam 106, and the transparent cover 108 define a sealed volume 116 of depth d that is then filled with liquid crystals to complete the liquid crystal cell. In one embodiment the volume 116 has a depth d of approximately one micron, although the distance d can range from a distance on the order of millimeters to a distance on the order of micrometers. In the embodiment shown, the LC cell 100 is attached to a substrate 103, which in one embodiment is a ceramic substrate but in other embodiments may be something different. The ceramic substrate 103 can include other components not shown here, such as heat sinks, electronic circuits and/or components, and the like. The die 102 is electrically connected to the substrate 103 via bond pads 120 and wire bonds 124. The overhanging portion of the transparent cover 108 is electrically connected to the ceramic substrate, or to some circuitry thereon, by a crossover ground 126.

FIG. 1C illustrates the structure of the transparent cover 108 of the LC cell 100. The cover 108 includes a transparent substrate 110 with an alignment layer 117. The alignment layer is applied to a surface 115 of the substrate 110. Although not shown, a transparent electrically conductive layer is usually applied to the substrate; the conductive layer is commonly applied to the surface 115 of the substrate (i.e., it is sandwiched between the substrate 110 and the alignment layer 117), but in other embodiments can also be applied to the outer surface 113 of the substrate. The electrically conductive layer functions as an electrode, so that an electric field can be applied to the liquid crystals within the volume 116 to cause the liquid crystals to alter their orientation and thus alter the display. In one embodiment, the electrical signal is routed through the die via traces connected to the bond pads 120 and flows through the liquid crystal distance d to the electrically conductive layer as it aligns the liquid crystals to display the image. The electrically conductive layer is grounded back to the substrate 103 via a cross over ground connection 126. The side of the alignment layer 112 that is in contact with the liquid crystals in the volume 116 usually includes a plurality of microgrooves 118 therein. The purpose of the microgrooves 118 is to provide an initial alignment to the liquid crystals within the volume 116; in most cases, the initial alignment of the liquid crystals is parallel to the microgrooves. It is preferable that the initial alignment of the liquid crystal has a substantial penetration depth—that is, the alignment layer should cause the liquid crystals in the volume 116 to become initially aligned in the desired direction throughout the entire depth d of the liquid crystal (see FIG. 1A).

Currently, the microgrooves 114 in the alignment layer are formed by hand-rubbing the layer 108 with some sort of abrasive material such as rayon pile cloth with a 600 μm fiber length, 15 μm fiber diameter and a thread count of 32,000 thread per square centimeter. In addition to the less-than-ideal quality of the resulting microgrooves, the hand-rubbing method for forming the microgrooves has several other disadvantages. Among other things, it does not result in a uniform and consistent groove pattern, which can affect the penetration depth of the alignment. Hand rubbing is also time intensive and labor intensive, which leads to increased costs for liquid crystal displays. The hand-rubbing method is difficult to adapt to a manufacturing environment, and also makes it difficult or impossible to realize economies of scale in the manufacturing of the liquid crystal displays.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a process for imprinting microgrooves in a polymer layer to create an alignment layer such as those used in liquid crystal displays are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1A:
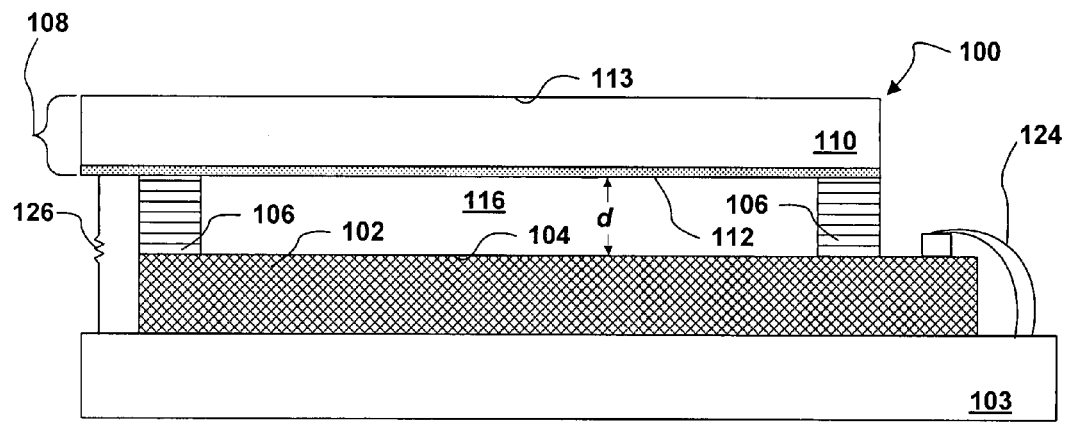
FIGS. 1A and 1B are a side elevation and a plan view, respectively, of an embodiment of a liquid crystal display.
Figure 1B:
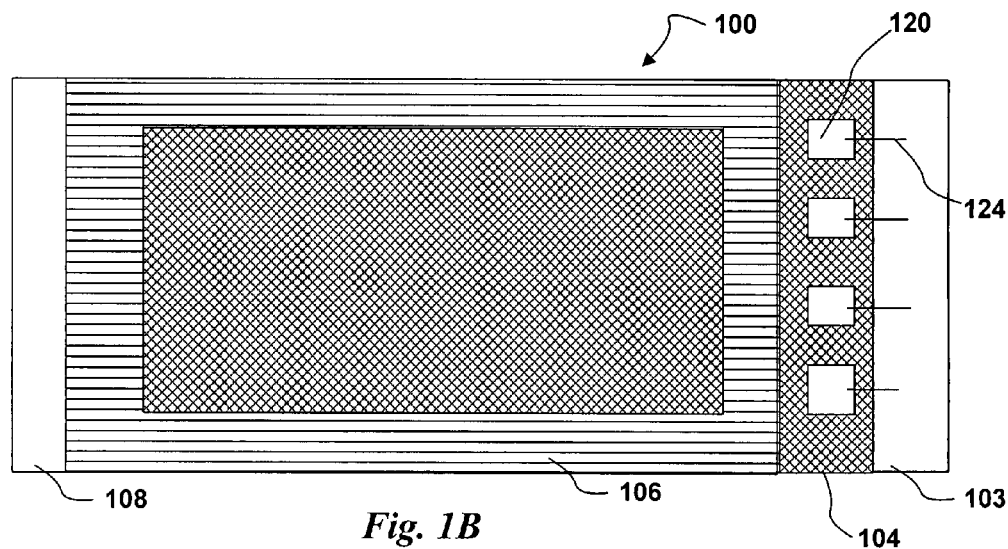
Figure 1C:
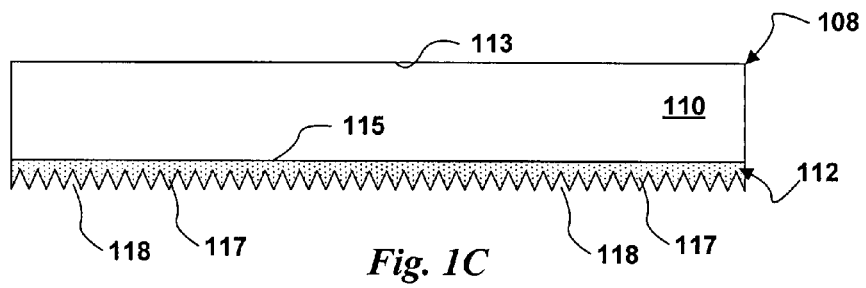
FIG. 1C is an enlarged side elevation of an embodiment of a transparent cover for a liquid crystal display, the cover having an alignment layer thereon.
Figure 2A:
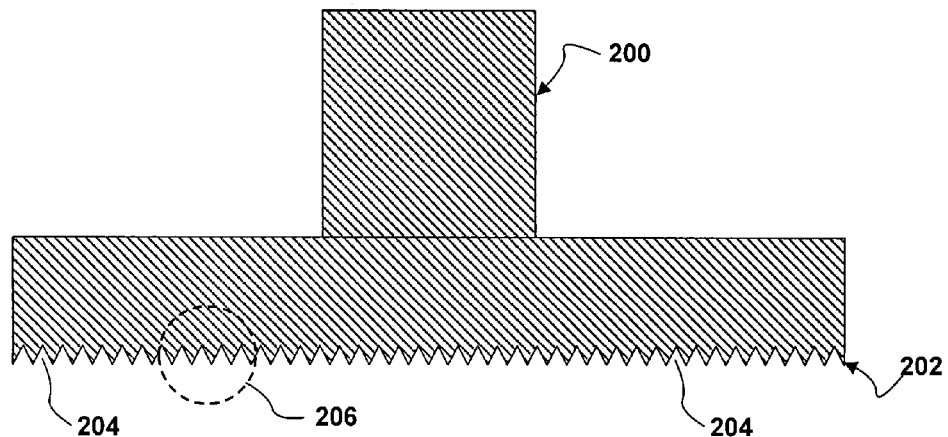
FIG. 2A is an enlarged side elevation of an embodiment of a microtool having a pattern of microgrooves therein.
Figure 2B:
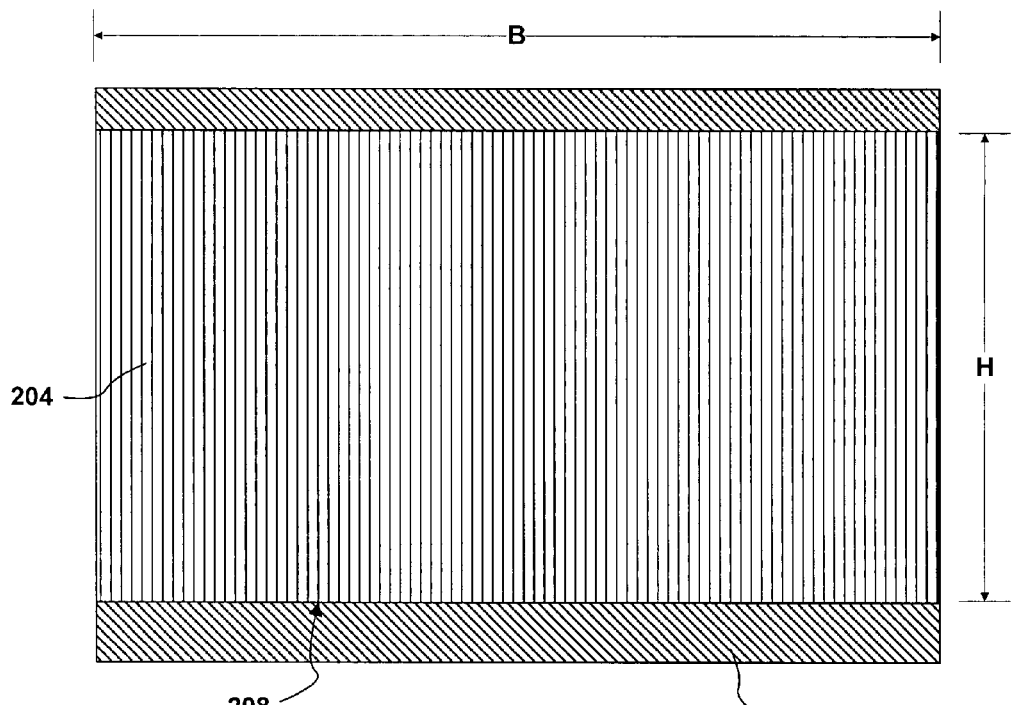
FIG. 2B is an enlarged plan view of an embodiment of a contact surface of a tool like the one shown in FIG. 2A.

FIGS. 2A-2B illustrate an embodiment of a microtool 200 for imprinting a plurality of microgrooves in an alignment layer. The tool 200 is referred to as a "microtool" because of the small dimensions of the features it will be used to pattern; the tool itself is not necessarily small, although it can be. FIG. 2A is a side elevation illustrating the basic construction of the tool 200, which includes a contact surface 202 having a plurality of microgrooves 204 formed therein. In one embodiment, the tool 200 is made using Nickel (Ni), although in other embodiments different materials or combinations of materials can be used. In one embodiment, the microgrooves 204 can be etched or otherwise put on the contact surface 202 using conventional means such as lithography. FIG. 2B is a plan view of the contact surface 202 of the tool 200. The contact surface 202 of the tool 200 includes a pattern 208 having a plurality of microgrooves therein. The pattern has a breadth B and depth H that will, in one embodiment, correspond to the size of the dam in the LC cell for which the tool will be used to create microgrooves in the alignment layer.

Figure 3A:
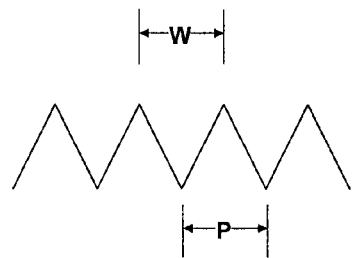
FIGS. 3A-3D are enlarged cross-sections of various embodiments of microgrooves that could be used with an embodiment of a tool such as the one shown in FIGS. 2A-2B.
Figure 3B:
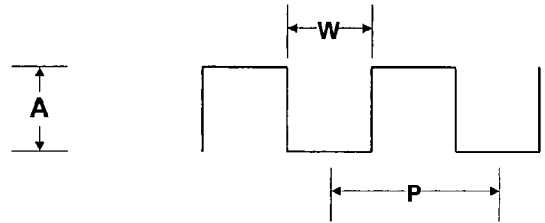
Figure 3C:
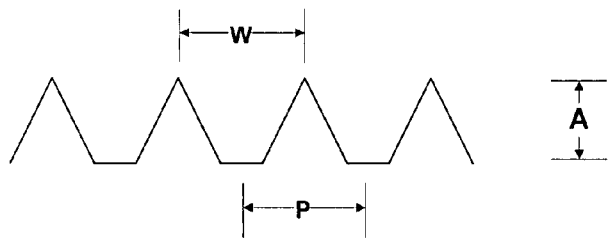
Figure 3D:
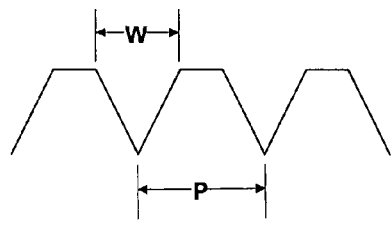

FIGS. 3A-3D are enlargements of the circular area 206 in FIG. 2A illustrating various embodiments of cross-sectional profiles that the microgrooves 204 can take. The cross-sectional profiles of the microgrooves created in the polymer film will, of course, correspond to the cross-sectional profile of the microgrooves 204. FIG. 3A illustrates microgrooves having a cross-sectional profile that is a triangular or "sawtooth" pattern. FIG. 3B illustrates microgrooves with a cross-sectional profile that is square. FIGS. 3C and 3D illustrate two variations of microgrooves, both with a cross-sectional profile that can be described as a "spaced triangular profile" or "spaced sawtooth profile." In one embodiment, the widths W of individual grooves can be on the order of nanometers, while the separation P of the individual grooves (also known as the "pitch") can also be on the order of nanometers. In one particular embodiment, for example, the grooves can have a width W of 100 nm and a pitch P of 150 nm. Substantially larger and/or smaller groove widths and pitches are, of course, possible in other embodiments; both the widths and pitches of the microgrooves can vary from distances on the order of millimeters to distances on the order of angstroms, depending on the application.

In each embodiment of the cross-sectional profiles shown in FIGS. 3A-3D, the microgrooves 204 have depth A. In most cases, the depth A will be less than or equal to the thickness t of the polymer film 410 in which the alignment layer will be created (see FIG. 4B). In other cases, however, a depth A greater than the polymer film thickness t can be used to create a desired profile. For example, microgrooves having a cross-sectional profile similar to that shown in FIG. 3D can be created using a tool 200 with microgrooves having the cross-sectional profile shown in FIG. 3A if the depth A is greater than the thickness t of the polymer film 410.

Although only a small number of microgroove cross-sectional profiles are shown herein, the cross-sectional profile of the microgrooves may take other forms that are not shown here. Additionally, all microgrooves 204 in the tool—and thus all the corresponding microgrooves formed in the alignment layer—need not have the same cross-sectional profile, but can include combinations of different cross-sectional profiles and/or different depths A. Also, the microgrooves 204 need not have a regular, constant depth; microgroove patterns in which the depths of individual grooves vary from each other are entirely possible.

Figure 4A:
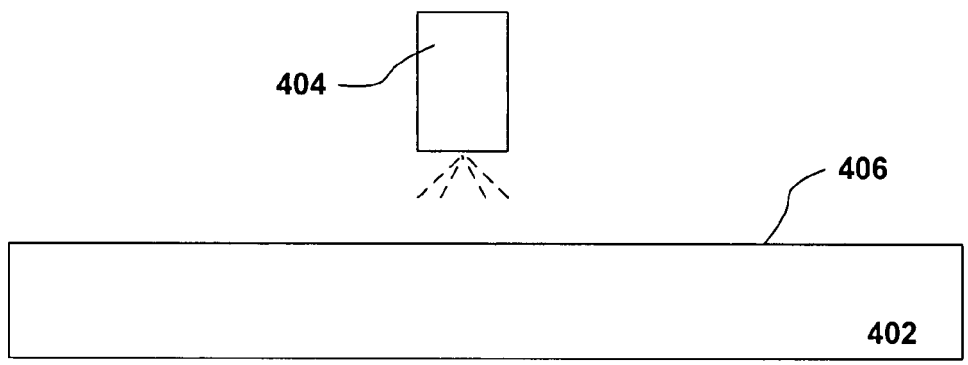
FIGS. 4A-4F illustrate an embodiment of a process for imprinting microgrooves on a polymer film applied to a glass substrate such as shown in FIG. 1C using a tool such as shown in FIGS. 2A-2B.
Figure 4B:
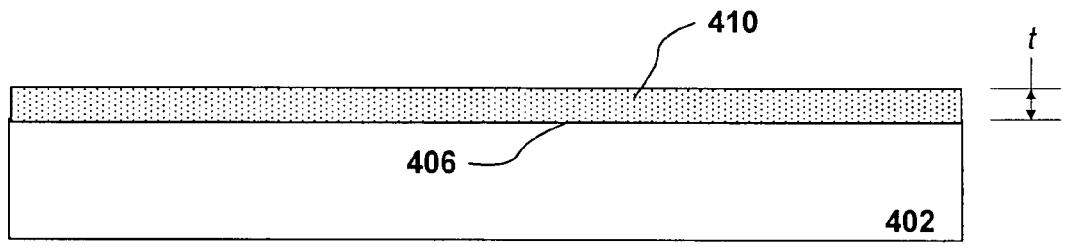

FIGS. 4A-4F illustrate an embodiment of a process for imprinting microgrooves in a polymer layer. FIGS. 4A and 4B illustrate the application of a polymer layer 410 onto a surface 406 of a transparent substrate 402. In one embodiment, the transparent substrate 402 can be glass, but in other embodiments different types of transparent substrate may be used. Also in one embodiment the polymer film is a polyimide (PI); an example of a commercially available polyimide is Nissan RN1332, which is available from the Nissan Corporation of Tokyo, Japan. In other embodiments the polymer film can be something else, such as a polyvinylalcohol (PVOH); examples of commercially available PVOHs include Nissan SE150 and SE12710, both of which are also available from the Nissan Corporation of Tokyo, Japan. In still other embodiments, other polymers not listed or mentioned here can be used. In the embodiment shown in FIG. 4A, a spray unit 404 sprays a suitable polymer onto the surface 406 until the desired film thickness t is achieved, at which time the spraying stops. In other embodiments, the film 410 can be applied to the surface 406 by other means, such as spin coating. FIG. 4B illustrates the result of applying the polymer film to the surface of the transparent substrate 402, which is the substrate with a polymer film 410 thereon. The polymer layer is preferably of uniform thickness t. The transparent substrate 402 generally has a thickness on the order of millimeters, while the polymer film 410 has a thickness in the micrometer or nanometer range. In one particular embodiment, for example, the substrate 402 has a thickness of about 0.5 mm, while the polymer film has a thickness t of about 50 nm.

Figure 4C:
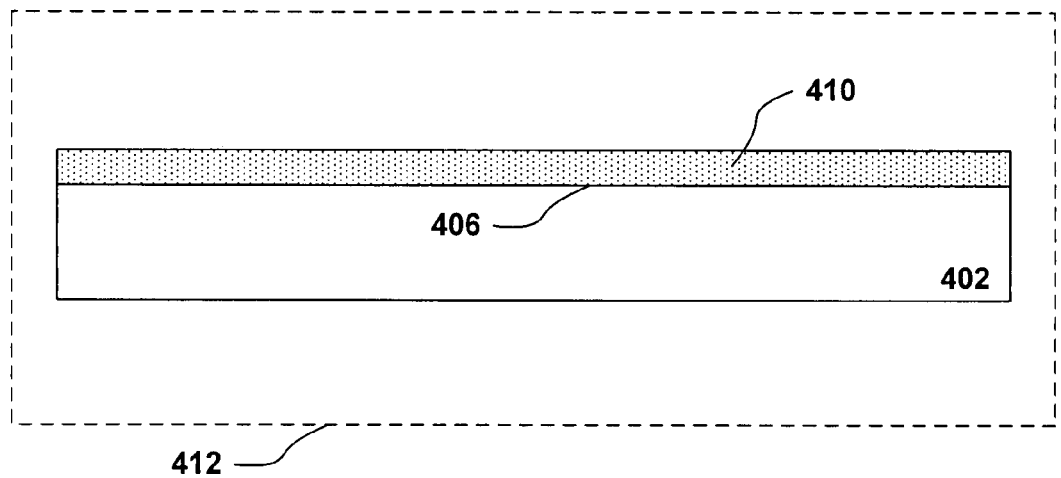

FIG. 4C illustrates conditioning the polymer film 410 to better receive an imprint of microgrooves from an imprinting tool. The type of conditioning required will depend mostly on the polymer chosen for the polymer film 410. In the embodiment shown in FIG. 4C, the transparent substrate 402 and polymer film 410 are inserted into an oven or autoclave 412, so that the temperature of the polymer film 410 can be increased. By increasing the polymer film's temperature, it can become more receptive to imprinting of microgrooves by a tool. In other embodiments, however, conditioning the polymer film may require something different. For example, the polymer film may require partial or complete curing before the microgrooves can be imprinted; this would be the case if the polymer is liquid upon application to the surface 406 and prior to curing, or if the polymer film otherwise has very low viscosity. In still other embodiments, it can be possible to imprint the microgrooves in the polymer film without doing anything further to the polymer film after its application to the substrate; in such cases, conditioning the polymer film amounts to doing nothing. Thus, conditioning the polymer film prior to imprinting is optional, depending on the exact polymer chosen for the polymer film.

Figure 4D:
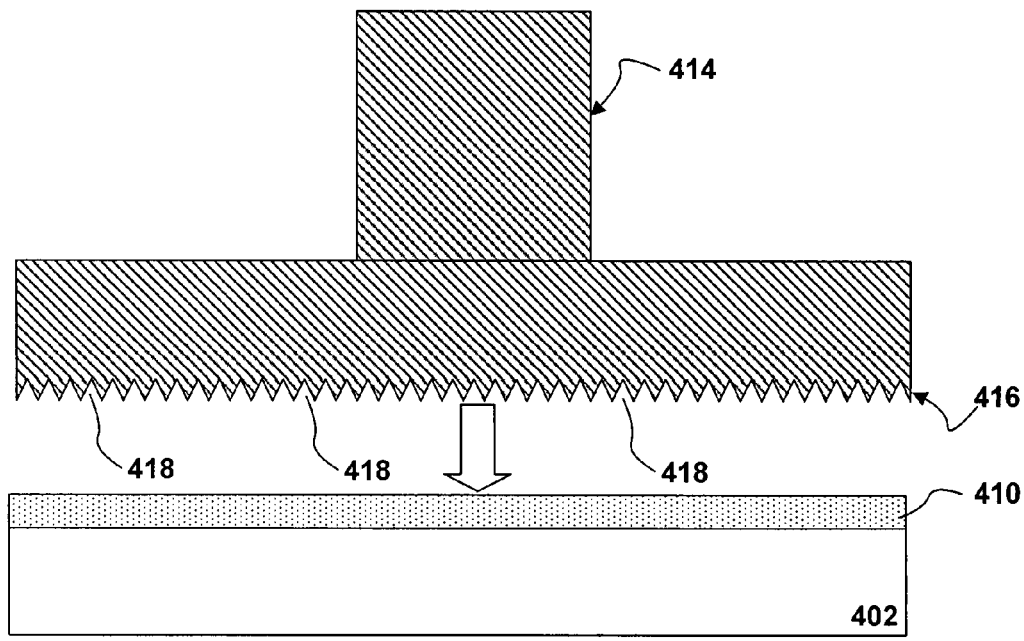
Figure 4E:
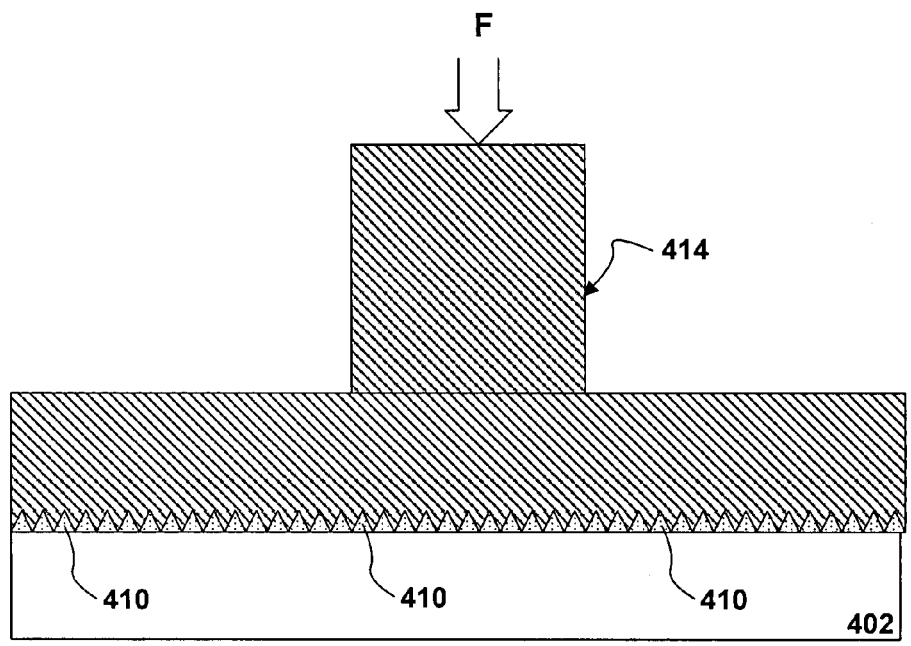
Figure 4F:
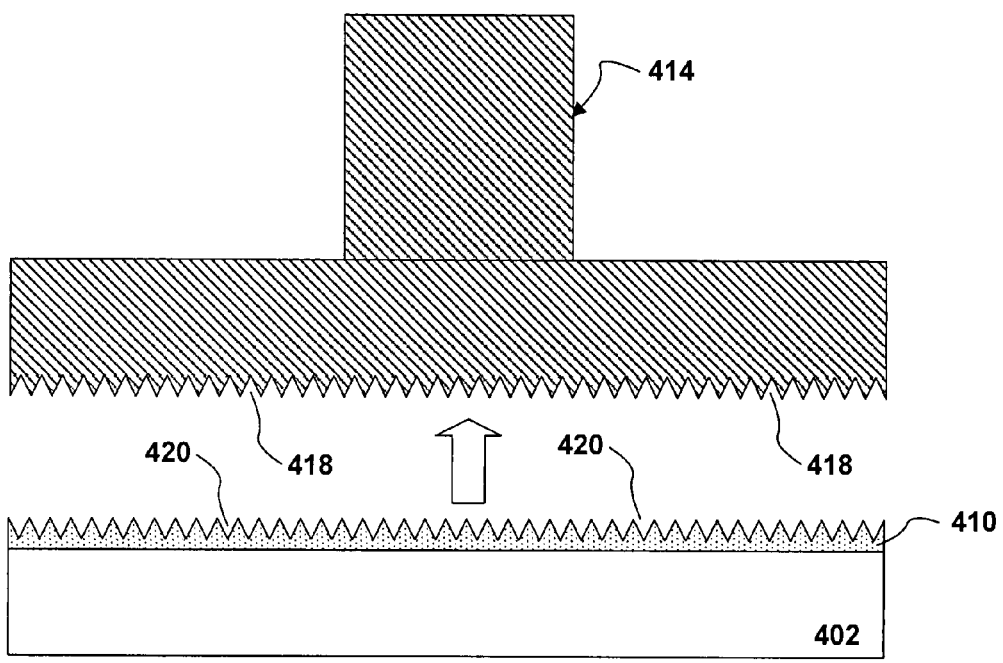

FIGS. 4D-4F illustrate an embodiment of a process for imprinting microgrooves in a polymer layer 410 to form an alignment layer. As shown in FIG. 4D, a tool 414 having a contact surface 416 with a pattern therein comprising a plurality of microgrooves 418 is brought down onto the polymer film 410. In FIG. 4E, the contact surface 416 of the tool, and thus the microgrooves 418 in the tool, are brought in contact with the polymer film 410 and, if necessary, a force F is applied to the tool to press the microgrooves 418 of the tool into the polymer film, creating a corresponding pattern of microgrooves 420 (see FIG. 4F) in the polymer film and turning the polymer layer into an alignment layer. The magnitude of the force F needed to imprint the microgrooves in the polymer layer will vary depending on the polymer used and its physical state at the time of imprinting; in some cases little or no force will need to be applied, while in others considerable force may need to be applied. In FIG. 4F, the contact surface of the tool is removed from the polymer layer, leaving the microgrooves 420 behind in the polymer layer 410. In some embodiments of the process, the polymer layer 410 may require further processing after imprinting. For example, if the microgrooves were imprinted after a partial curing of the polymer layer, then further curing will be necessary to further harden the polymer layer 410.

Figure 5A:
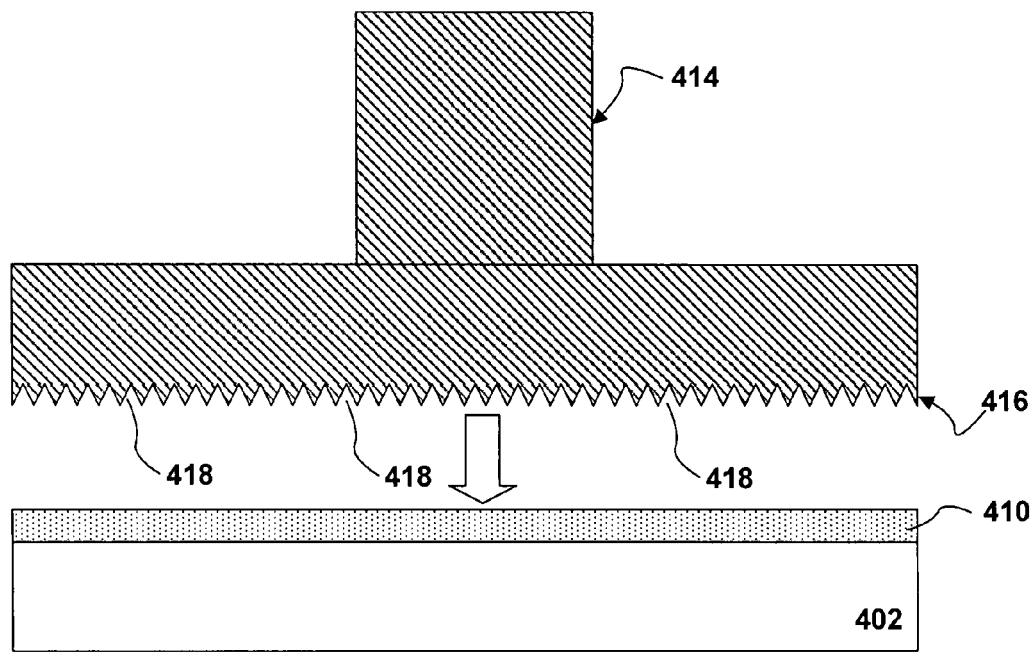
FIGS. 5A-5C illustrate an alternative embodiment of a process for imprinting microgrooves on a polymer film applied to a glass substrate such as shown in FIG. 2 using a tool such as shown in FIG. 3.
Figure 5B:
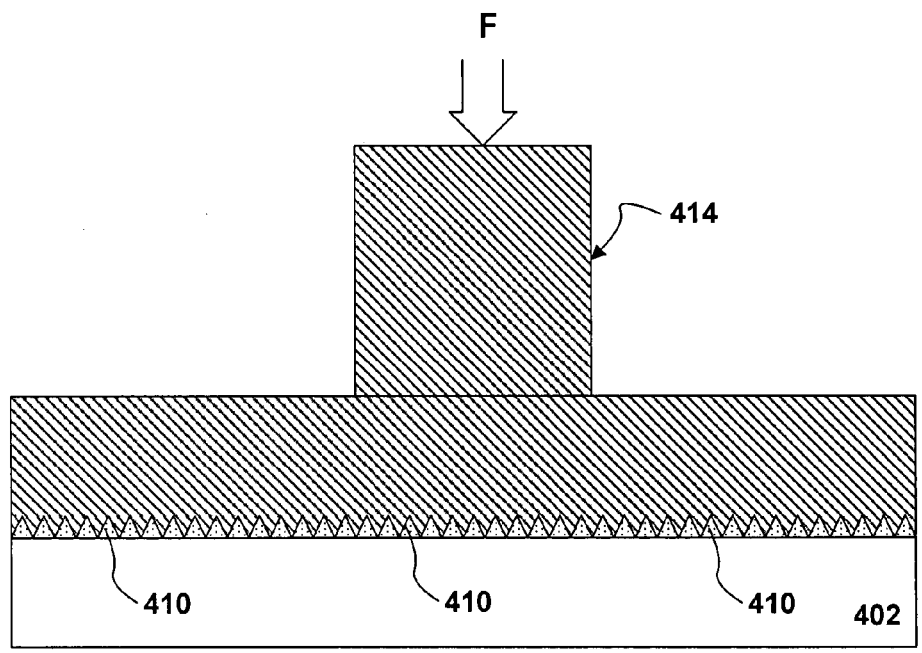
Figure 5C:
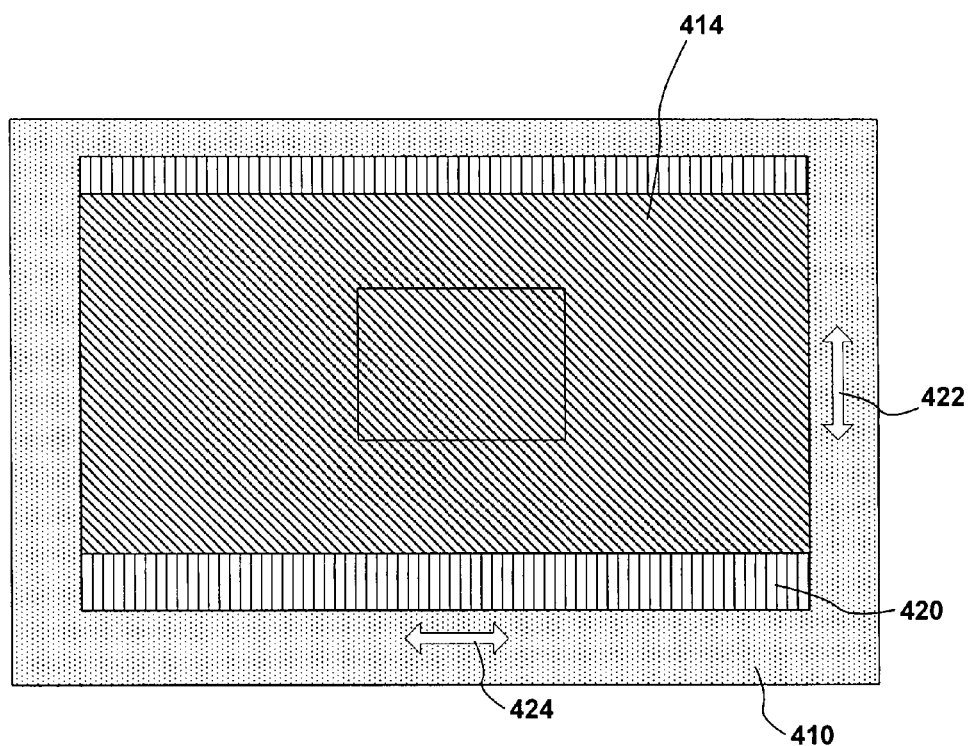

FIGS. 5A-5C illustrate an alternative embodiment of a process for imprinting microgrooves in a polymer layer. FIGS. 5A-5B depict parts of the process similar to those shown in FIGS. 4D-4E. In FIG. 5A, a tool 414 having a contact surface 416 with a pattern therein comprising a plurality of microgrooves 418 is brought down onto the polymer film 410. In FIG. 5B, the contact surface 416 of the tool, and thus the microgrooves 418 in the tool, are brought in contact with the polymer film 410 and a force F is applied to the tool if necessary to press the microgrooves 418 of the tool into the polymer film, creating a corresponding pattern of microgrooves 420 in the polymer film and turning the polymer layer into an alignment layer.

FIG. 5C is a top plan view of what is shown in elevation view in FIG. 5B. The contact surface 416 of the tool 414 is in contact with the polymer film 410, so that the microgrooves 418 on the contact surface of the tool 414 create microgrooves 20 in the polymer film. In this embodiment, however, while the contact surface 416 remains in contact with the polymer film, the entire tool is oscillated, either along the microgrooves in the direction of the arrows 422 or perpendicular to the microgrooves in the direction of the arrows 424. The amplitude of the tool's oscillation will likely be very small, the intent being to better form the microgrooves in the polymer layer by, for example, polishing the microgrooves through the oscillation of the tool or removing polymer material displaced during imprinting. In an alternative embodiment, an abrasive substance may be applied to the microgrooves 318 of the tool, so that there will be more polishing and/or forming action when the tool is oscillated. The abrasiveness of the substance applied in the microgrooves will depend on such factors as the hardness of the polymer film 310 and the amount of forming and/or polishing required.

The above description of illustrated embodiments of the invention, including what is described in the Abstract, is not intended to be exhaustive or to limit the invention to the precise forms disclosed. While specific embodiments of, and examples for, the invention are described herein for illustrative purposes, those skilled in the relevant art will recognize that various equivalent modifications are possible within the scope of the invention. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A process comprising:
    applying a polymer film to a transparent substrate;
    optionally conditioning the polymer film; and
    imprinting a plurality of microgrooves in the polymer film by pressing a contact surface of a tool against the polymer film and oscillating the contact surface in the plane of the polymer film, the contact surface having a pattern formed therein including a plurality of microgrooves.

2. The process of claim 1 wherein the polymer film comprises a polyimide (PI) or a polyvinylalcohol (PVOH).

3. The process of claim 1 wherein the transparent substrate comprises glass.

4. The process of claim 1 wherein applying the polymer film to the transparent substrate comprises spraying or spin-coating the polymer film onto the transparent substrate.

5. The process of claim 1 wherein the plurality of microgrooves in the pattern have a selected profile.

6. The process of claim 5 wherein the selected profile is a square profile, a triangular profile, a spaced triangular profile, or a combination thereof.

7. The process of claim 1 wherein conditioning the polymer film comprises raising the temperature of the polymer film.

8. The process of claim 1 wherein conditioning the polymer film comprises at least partially curing the polymer film.

9. The process of claim 1 wherein the microgrooves have an abrasive material embedded therein.

10. A process comprising:
    providing a transparent substrate having a polymer film applied on one side thereof;
    providing a tool having a contact surface, the contact surface having a plurality of microgrooves formed thereon;
    pressing the contact surface against the polymer film; and
    oscillating the contact surface in a plane of the polymer film.

11. The process of claim 10 wherein the polymer film comprises a polyimide (PI) or a polyvinylalcohol (PVOH).

12. The process of claim 10 wherein the transparent substrate comprises glass.

13. The process of claim 10 wherein the plurality of microgrooves have a selected profile.

14. The process of claim 13 wherein the selected profile is a square profile, a triangular profile, a spaced triangular profile, or a combination thereof.

15. The process of claim 10, further comprising optionally conditioning the polymer film.

16. The process of claim 15 wherein conditioning the polymer film comprises raising the temperature of the polymer film.

17. The process of claim 15 wherein conditioning the polymer film comprises at least partially curing the polymer film.

* * * * *